July 22, 1958     I. A. CIAFFA     2,844,138
SPLITTING MACHINES
Filed Aug. 23, 1955     6 Sheets-Sheet 1

INVENTOR.
ITALO A. CIAFFA.
BY Howard P. King
ATTORNEY.

July 22, 1958

I. A. CIAFFA 2,844,138

SPLITTING MACHINES

Filed Aug. 23, 1955

SLICES OF INDISCRIMINATE THICKNESSES

SLICES OF CORRECT THICKNESSES

INVENTOR.
ITALO A. CIAFFA.
BY
Howard P. King
ATTORNEY.

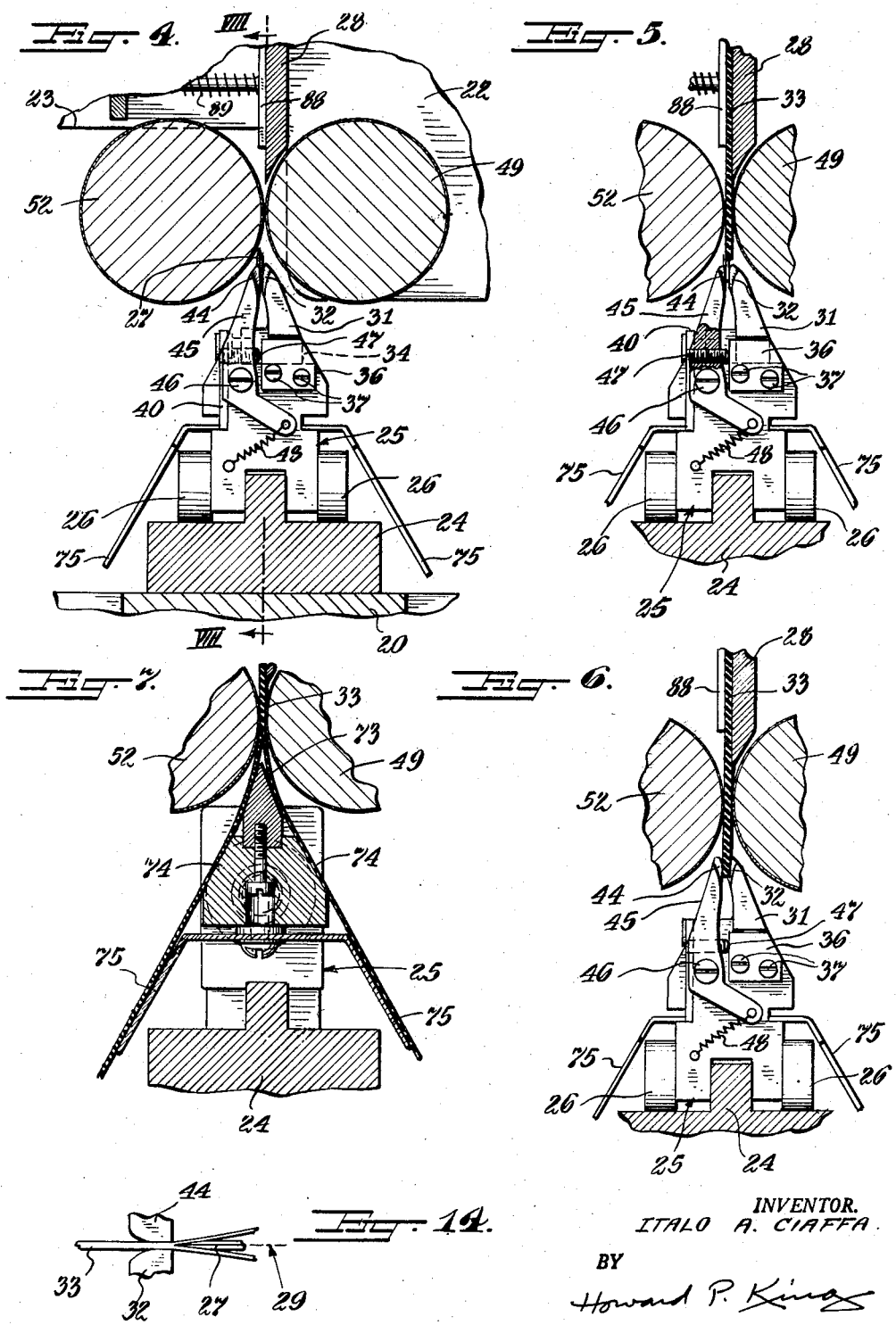

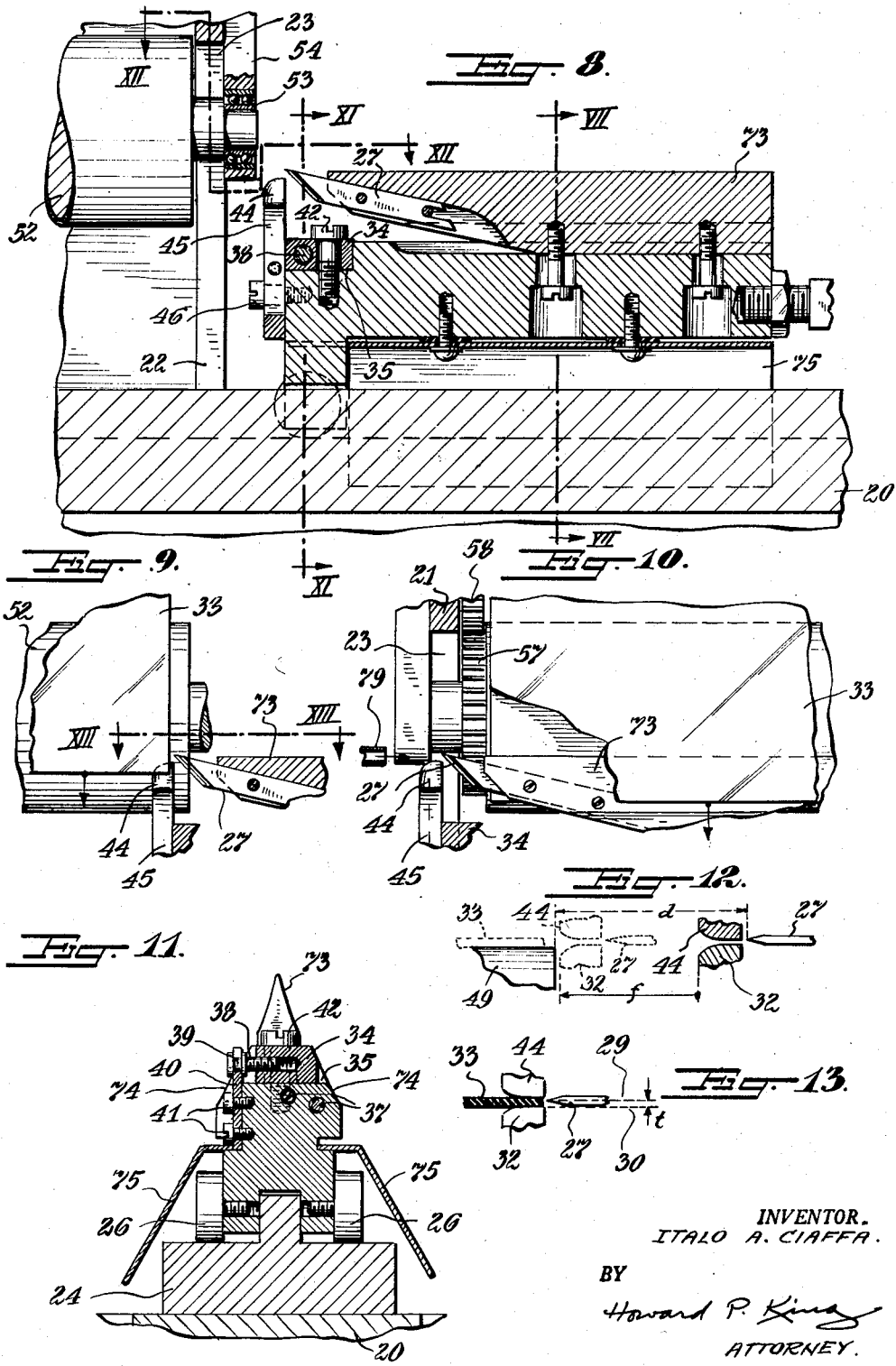

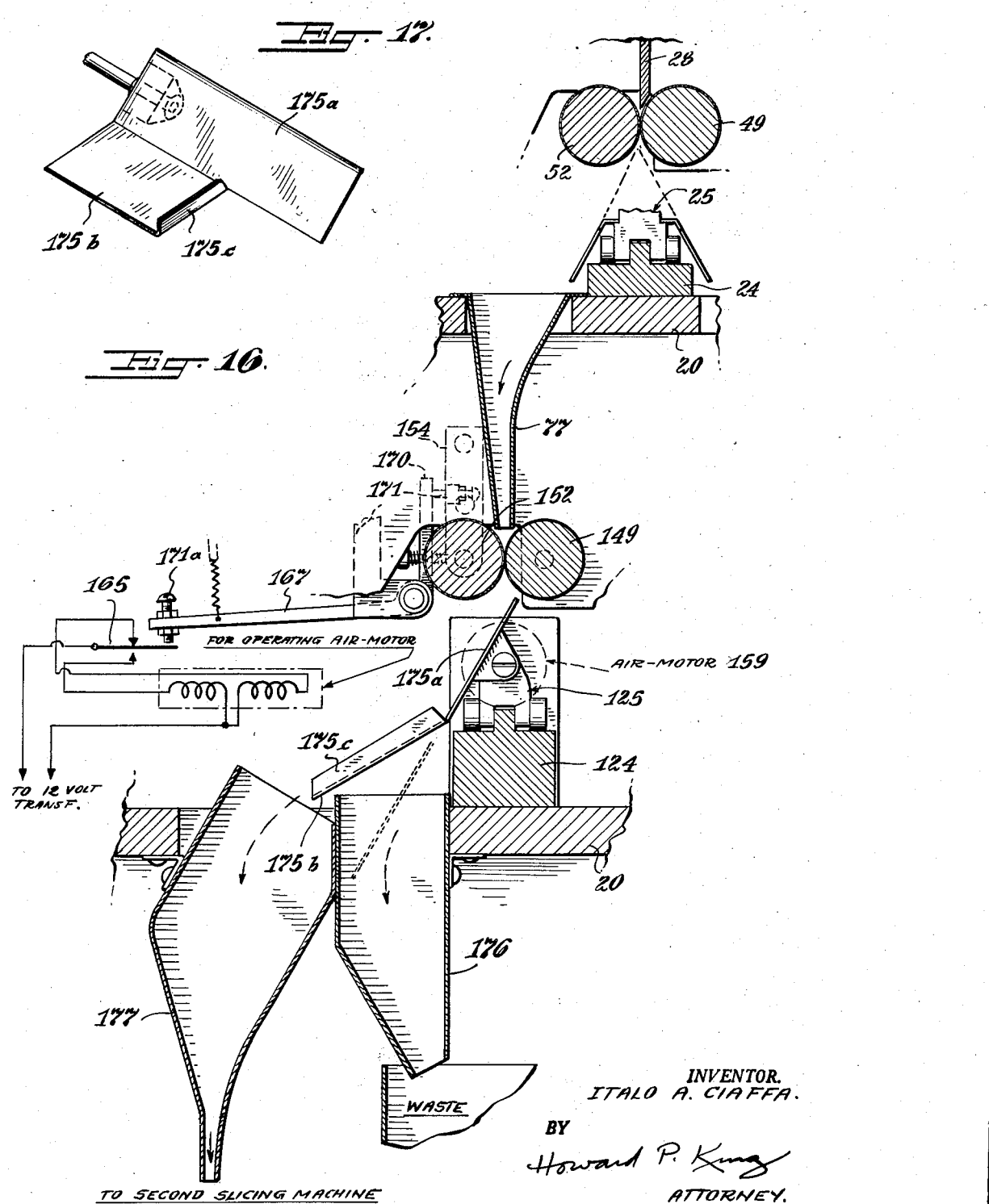

July 22, 1958

I. A. CIAFFA 2,844,138

SPLITTING MACHINES

Filed Aug. 23, 1955

INVENTOR.
ITALO A. CIAFFA
BY
Howard P. King
ATTORNEY.

United States Patent Office 2,844,138
Patented July 22, 1958

2,844,138

SPLITTING MACHINES

Italo A. Ciaffa, Brooklyn, N. Y., assignor of one-half to Bruno Schneider, Laurelton, N. Y., and Oscar Marquad, Short Hills, N. J.

Application August 23, 1955, Serial No. 529,999

11 Claims. (Cl. 125—24)

This invention relates to splitting machines, and more particularly to machines for splitting laminated material of which mica is a specific example, although the general category of laminated material includes other items of which slate, certain woods, cardboard, shells and so forth are some susceptible to splitting by this machine.

A primary object of the invention is to provide a machine that will split laminated material and obtain from the work piece a resultant slice or sheet of desired thickness.

The invention further contemplates producing a slice or sheet the thickness of which will be within a close tolerance of exactitude.

Another object of the invention is to provide a machine adjustable to successively produce any one thickness of slices or sheets to which the machine is set, but capable of being readily re-set to produce a different thickness when desired.

An important feature of the invention is to obtain rapidity of operation for enabling work pieces to be introduced one after another as fast as an operator can handle the work pieces.

An essential requirement of the invention is to separately accumulate the pieces sliced to desired thickness and to keep the remaining part of the work piece from becoming mixed therewith.

The invention further proposes automatic operation of slicing instigated by introduction of a work piece of greater thickness than the desired thickness of slice or sheet which the machine is set to produce.

Yet another object of the invention is to automatically sort the discharged work pieces and introduce those of adequate thickness into another splitting machine.

Still further objects, beneficial results and novel features of construction will appear to persons skilled in the art to which the invention appertains as the description proceeds, both by direct recitation thereof and by inference from the context.

Referring to the accompanying drawings, in which like numerals of reference indicate similar parts throughout the several views;

Figure 4 is a sectional view on line IV—IV of Fig. 1;

Figures 5, 6 and 7 are sectional views similar to Fig. 4, and showing the work piece in progressive stages of introduction and splitting, and the carriage in Fig. 7 being at its advanced position is there also in section, that line of sectioning of the carriage being indicated at VII—VII of Fig. 8;

Figure 8 is a vertical longitudinal section of the carriage and associated parts;

Figure 9 is a view similar to a portion of Fig. 8, showing the splitting blade advanced by the carriage ready to engage and split the work piece;

Figure 10 is a view similar to Fig. 9, and showing the splitting blade advanced by the carriage to the end of its forward stroke;

Figure 11 is a cross-section on line XI—XI of Fig. 8;

Figure 12 is a view illustrating the preliminary stroke range of the splitting blade before reaching the work piece for affording corresponding range of movement of the work piece from the feed roller to the level of the path of said blade;

Figure 13 is a top edge view of the piercing end of the blade, with a work piece in cross section showing the relation of the blade about to split the work piece at the predetermined desired thickness of slice;

Figure 14 is a similar view showing the splitting in progress;

Figure 15 is an electrical diagram showing the circuit by which the blade-actuating air motor is controlled;

Figure 16 is a cross sectional view of the general organization of the sorting mechanism for the discharged work pieces from a first to a second splitting machine;

Figure 17 is a perspective view of the reciprocating sorting chute; and

Laminated materials, particularly as found in the natural state, of which mica constitutes an outstanding example, have thicknesses which vary from piece to piece. A manufacturer desiring to use such laminated materials heretofore has been put to the expense and time-consuming operation of gauging, assorting and selecting the pieces of proper thickness for his purpose and attempting to split by hand those pieces that were too thick as received. Then after splitting, the resultant pieces had to be remeasured and assorted.

Viewed in its broad aspects, the present invention comprises a splitting machine into which the pieces of varying thicknesses as received at the factory, are fed successively. One face of the material rides against a fixed guide, which establishes the basic plane for the gauge thickness of the desired resultant product, which for brevity will be referred to herein as the "good piece." A movable blade is provided in a second plane parallel to the basic plane and at a distance from said basic plane equal to the desired thickness for the good piece. Said blade moves in its own plane toward the edge of the work piece and penetrates between laminations thereof at the predetermined spacing from the basic plane so as to split off the good piece quite precisely at the desired thickness. What is left from the work piece after splitting off the good piece, for brevity will be called the "bad piece," that term merely indicating that the bad piece does not have a predetermined thickness. The machine therefore gauges, splits and sorts the good pieces from the bad pieces, but the so-called bad pieces may again become work pieces.

It has been found to be a fact that all of the work pieces as received at the factory have a thickness greater than the ultimately desired product or good pieces. No pre-gauging or sorting consequently has been found necessary, but it is within the scope of the invention to utilize a preliminary sorting mechanism of the same character as the sorting mechanism provided from the above-described splitting operation for the bad pieces.

The bad pieces discharged from the splitting machine are sorted, as they discharge, to remove from further operation any of the pieces that are too thin for desired use, the remainder then becoming work pieces for again passing through splitting operation in the same splitting machine through which they have just passed, or through another splitting machine like the first but automatically receiving the new work pieces directly from the sorting mechanism for the first splitting machine. This sequence may be repeated by subsequent splitting and sorting operations to take care of maximum thickness of pieces originally received at the factory.

Figure 1:
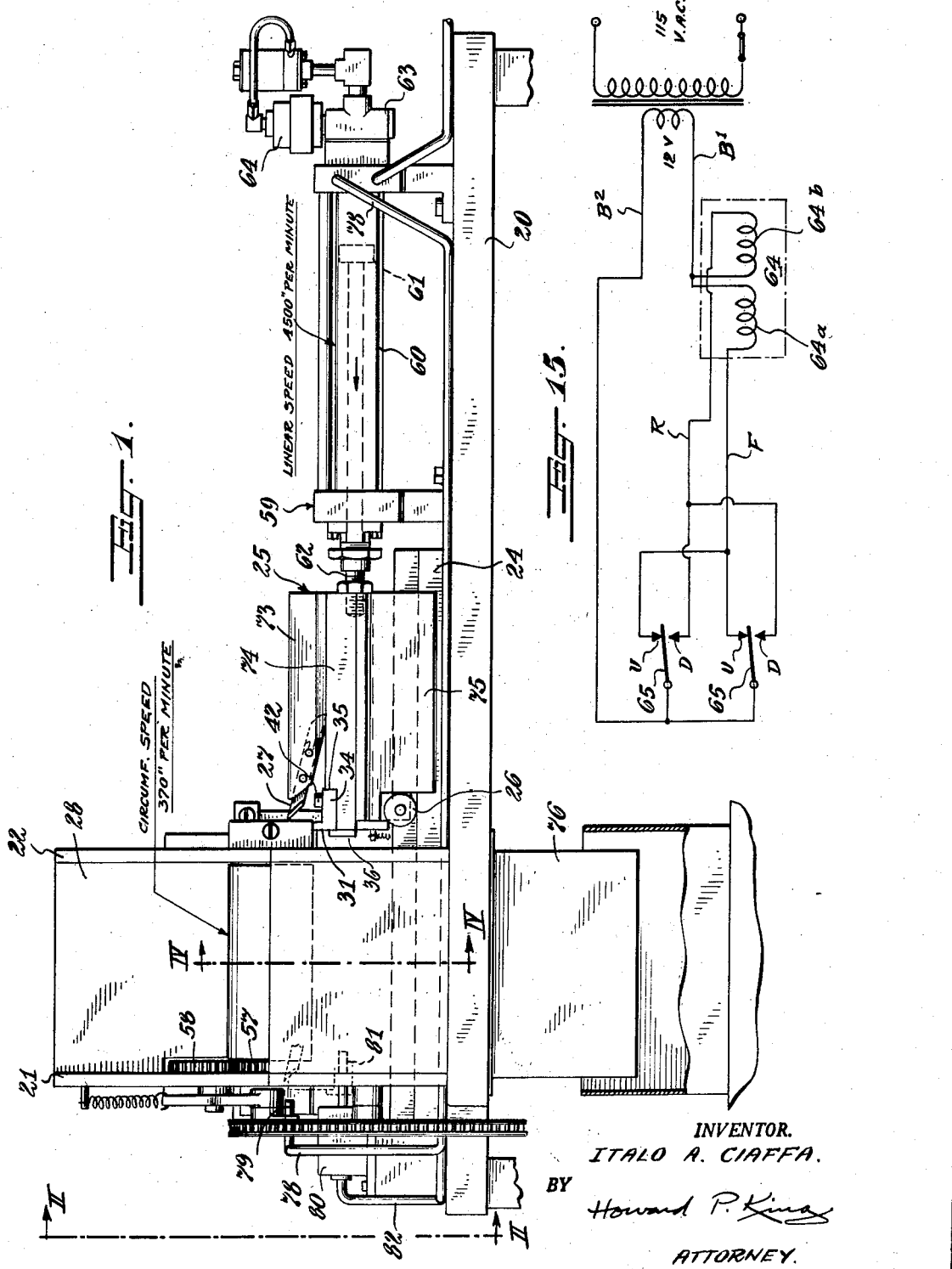
Figure 1 is a side elevation of a splitting machine embodying the invention.

Giving attention now to the specific embodiment of the invention illustrated in said drawings, and considering first the splitting portion of the machine, the reference numeral 20 designates a horizontally disposed table or platform constituting a fixed base for the various parts. For convenience of description and orientation of parts referred to, the end of the machine at the left of Fig. 1 and shown in elevation in Fig. 2, will be identified as the front end of the machine, and similarly, the side on display in Fig. 1 and toward the right of Fig. 2, will be termed the the front side of the machine.

In the vicinity of the front end of the machine are two parallel plates spaced from each other and held fast to the table 20 in perpendicular relation thereto. The plate nearest the front end of the machine is designated by numeral 21 and the rearward one by numeral 22. The central lower portion of each said plate is cut away providing an opening 23 thereat of considerable size. Extending through said openings and fixed on the table 20 is a track 24 for a carriage 25 to slide upon in a horizontal direction perpendicular to said plates. The track and carriage have a tongue and groove sliding fit and friction of operation is reduced by rollers 26 carried by the carriage and in rolling engagement with the track. The track protrudes rearwardly from the rearward plate 22 far enough to support the carriage when the carriage is slid to a rearward position entirely from between the plates. At the front end of the carriage is a blade 27 located in a vertical plane and with its end pointed and directed toward the front end of the machine.

Spaced away from said plane of the blade a distance as near as practical, equal to the thickness of the desired good piece of material, that thickness being designated by the letter t in Fig. 13, is a flat vertical guide plate 28 which extends between and perpendicularly of the aforementioned parallel plates 21, 22 and in height extends from approximately the top of opening 23 to the top of said parallel plates. In this descriptoin, the plane of the blade, indicated by dotted line 29 in Fig. 13, is the plane which includes the point of the blade, and as guide plate 28 is toward the front side of the machine from the plane 29, the rear face of said guide plate defines the plane thereof and is indicated by dotted line 30 in Fig. 13. At the front end of the carriage, as shown in Figs. 4 to 6, is adjustably affixed a rigid arm 31 projecting upwardly into proximity to the blade point closely in advance thereof and terminating at its upper end in what I term herein a rigid throat guide 32. While the forward end of this rigid throat guide flares somewhat toward the front side of the machine so as to receive the work piece 33 of material, the face thereof toward the rear side of the machine back from the flare is located as precisely as possible in the aforesaid plane 30. As the carriage moves forwardly, the work piece is simultaneously being fed downwardly into the path of the blade and before the blade engages the edge of the work piece said rigid throat guide contacts with and slides along the face of said work piece that is toward the front side of the machine. As that face of the work piece is also in contact with the guide plate, and as the faces of said guide plate and rigid throat guide toward the rear side of the machine are both in the common plane 30, the work piece is aligned vertically above and below the level of the point of the blade and with the face of said material toward the front side of the machine located at the precise distance t from the plane of the blade for splitting the material with desired thickness at its front side portion.

While throat guide 32 and arm 31 carrying the same must be rigid for accuracy of results, so likewise it is necessary to locate the same accurately. This is accomplished by forming said arm integrally with a bottom block 34 (see Fig. 1) such that, viewed from the front side of the machine, the arm and block appear L-shaped. The block seats in a shoulder recess 35 across the front end of the carriage below the blade and is held from leaving the recess at the front end of the carriage by a retaining cleat 36 fixed to the carriage by screws 37 (Figs. 4 to 6). A horizontally disposed adjusting screw 38 enters the face of the block at the rear side of the carriage and is threaded into said block. The outer end of said adjusting screw is grooved peripherally at 39 to rotate in and be kept from longitudinal movement by engagement with a forked retainer 40 secured by screws 41 at the rear side of the carriage. By manipulation of adjusting screw 38, the block can be moved to position at which the throat guide integral therewith is in its exact position of coincidence with the plane 30 with which the work-engaging face of guide plate 28 is also coincident. The block can then be locked in that position by a set screw 42 extending downwardly through an appropriate slot in the block into threaded engagement in the carriage.

Means are provided for effecting a resilient pressure against the rear face of the work piece in opposition to the rigid throat guide 32 for positively holding the front face of the work piece against said rigid throat guide during the forward stroke of the carriage and the downward movement of the work piece. This desideratum is accomplished by a movable throat guide 44 here shown as comprising an upper end portion of an arm 45 pivoted at 46 at the front end of the carriage. Said movable throat guide 44 is flared at its end toward the front end of the machine to cooperate with the flare of the rigid throat guide 32 to permit the front edge of the work piece to enter the throat. The movable throat guide is held slightly away from the rigid throat guide by an adjusting stop-screw 47 carried by pivoted arm 45 and directed toward and engageable with the rear edge of cleat 36. The movable throat guide is urged to its closed position toward the rigid throat guide by a suitably located spring 48.

Figure 2:
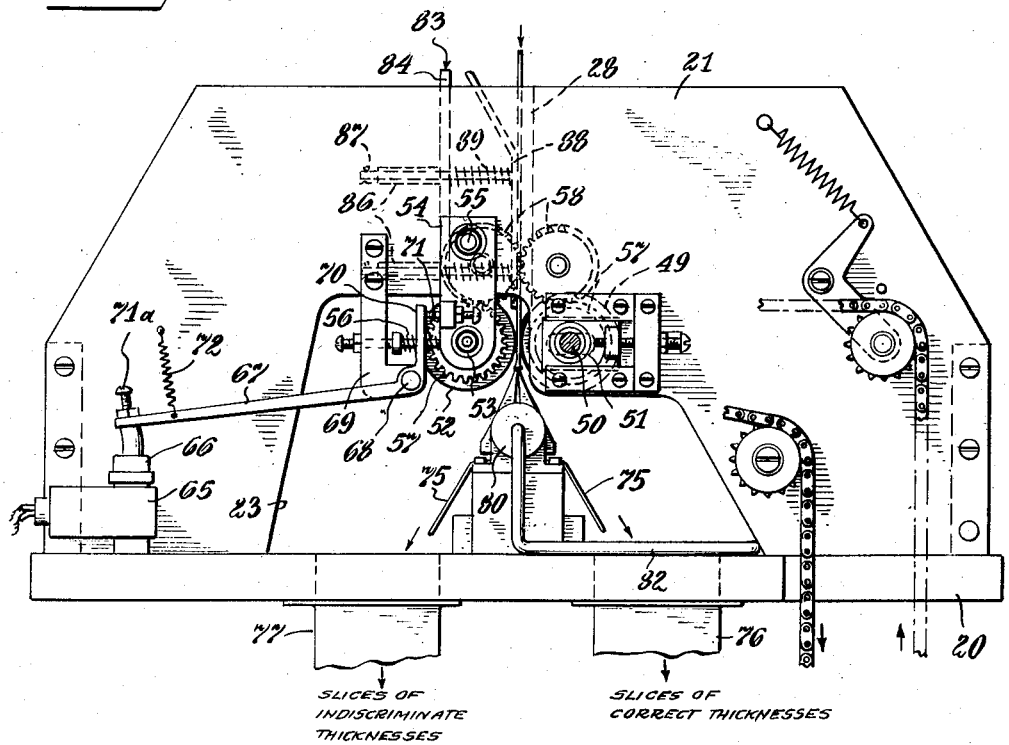
Figure 2 is an end view looking at Fig. 1 from the line II—II at the left thereof.

For actuating the work piece downward, I provide a power-driven drum or roller 49 which extends longitudinally between and axially perpendicular to aforementioned parallel plates 21, 22 and trunnioned by its axle 50, as best shown in Fig. 2, in adjustable bearing 51 carried by said plates. The adjustment of the bearings is in a horizontal direction and perpendicular to the aforesaid planes 29 and 30, and by this adjustment the most rearwardly protruding portion of the periphery of said drum or roller can be brought into position to be tangent with plane 30 at a location arranged to be as closely above the path of the blade as possible and therefore also above the path of the throat guide but below guide plate 28. The said rearwardly protruding portion of the periphery of the drum or roller 49 is constantly rotating downwardly and frictionally impels a work piece downward each time a work piece is introduced into contact therewith by being slid down guide plate 28.

Toward the rear side of the machine from the feeding drum or roller 49, axially parallel thereto, is another drum or roller, which, for distinguishing purposes will be herein referred to as gauging roller 52. This gauging roller 52 is carried in bearings 53 near the lower ends of hangers 54 the upper ends of which are pivoted at 55 to the parallel plates. Thus the gauging roller may swing toward and away from the feeding roller 49, but by spring loading 56 against said hangers, is pressed normally against the feeding roller and will apply desired pressure against a work piece introduced between the rollers and will assure frictional contact of the feeding roller with the work piece for positively actuating the work piece downward. If desired, the gauging roller may also be power driven, and for this purpose each roller is shown as having a spur gear 57 fast therewith at the ends thereof toward the front end of the machine, and each is in mesh with a respective one of two intermeshing idler gears 58 so that the gauging roller is driven in the proper direction from the power driven feeding roller and at the same peripheral speed.

It is a feature of the present invention that the carriage shall be reciprocated and that the presence of a work piece between the rollers 49 and 52 shall function to set the carriage into motion on its forward stroke, and the discharge of the work piece from between the rollers shall function to set the carriage in motion for its retracting or rearward stroke. A standard type of piston air motor 59 available on the market is here shown, description of which is not deemed necessary. Suffice it to say that the motor provides an air cylinder 60 to which air pressure may be applied at either end, and contains a piston 61 from which a piston rod 62 extends forwardly and is connected to the rear end of the carriage with which it is substantially in longitudinal alignment. A four-way valve 63 controls passage of air under pressure from a suitable pump or other source (not shown) selectively to either end of the cylinder and simultaneous release of pressure from the opposite end of the cylinder. The air valve is triggered by a solenoid 64 the core of which is electrically actuated in one direction and returned by air pressure in the opposite direction when the circuit is opened. Closed electrical circuit to the solenoid accordingly results in the air motor piston being driven forwardly, and opening the circuit to the solenoid coil results in the air motor piston being retracted.

According to the present invention, the closing and opening of the electrical circuit to the air motor solenoid is effected by one or both of two micro-switches 65 connected in parallel so that when either one closes the air motor is operated forwardly, and when both are opened, the air motor performs its retracting stroke. As the mechanism for operating each micro-switch is a duplicate of the other, description of one will suffice for both. Usual construction of standard micro-switches, such as I use, includes a depressible button 66, depression of which closes the switch circuit. I mount the micro-switch in fixed position on the respective one of parallel plates 21 and 22 under the outermost end of a long lever arm 67 of a bell-crank lever which has a pivot 68 at the other or inner end of said arm. The pivot 68 is mounted in a bracket 69 fixed on the respective one of plates 21, 22. The bell-crank lever has a short vertical arm 70 from the pivot, and this vertical short arm is engaged near its end remote from the pivot by the end of an adjustable screw 71 carried by hanger 54. A spring 72 is connected to the bell-crank and applies tension tending to hold the short arm 70 in engagement with said adjustable screw 71. When a work piece enters between rollers 49 and 52 the latter moves laterally by virtue of its mounting in hangers 54 which swing for that purpose and in doing so, apply swinging moment to the short arm 70 of the bell-crank lever, and since the long arm 67 multiplies the motion, adequate depression of the micro-switch button is obtained to operate the switch thereof and close the electrical circuit to the air motor solenoid 64. An adjusting screw 71a over the button may be manipulated instead of or in conjunction with adjustment of screw 71.

It is now opportune to point out that the point of the blade 27 in its retracted position, as shown in Fig. 12, is spaced a distance d from the nearest ends of the rollers, and the forward speed of the blade under actuation by the air motor and the downward speed of the work piece under actuation of the rollers are co-related, for instance 4500 inches per minute and 370 inches per minute respectively, to cause the work piece to travel downward far enough to be in the path of the blade at the moment the point of the blade arrives beneath the rollers. Furthermore, since it is preferable to have the throat guides ride onto the work piece at the side of said work piece, and since the throat guides are in advance of the blade, the distance f of the front of the throat guide from the rollers is made such that, at the speeds employed, the throat guide enters beneath the rollers just as the work piece travels into its path, and the blade, following immediately behind the throat guide enters the edge of the work piece without fail just above where the throat guide first engaged the work piece. It is preferable to have the traversing speed of the blade very much faster than the downward speed of the work piece so that the blade will complete its stroke with a minimum of downward movement of the work piece while the blade is in motion. From the foregoing description, it will now be apparent that the blade, which is pointed, reciprocates to move the blade point entirely across the work piece, and on its forward transitional stroke pierces the edge of the work piece and progressively produces a crevice across the work piece between laminations thereof from the pierced edge to the opposite edge of the work piece, thereby instigating the initial splitting of the work piece between those laminations. The structure accordingly provides a pointed transitional blade advancing the point of the blade to pierce the edge of the work piece with the point of the blade then continuing its forward movement for the full width of the work piece.

Closely behind the point of the blade at substantially the level thereof, is a wedge-shaped ridge 73 which extends longitudinally of the carriage at the top thereof, the length of said ridge approximating the length of the rollers so that when the carriage is at its forward position beneath the drums or rollers 49, 52, said ridge is longitudinally coextensive with said drums. Furthermore, the longitudinal peak of said ridge is situated in plane 29 of the blade and flares downwardly outward at both sides of said plane. As the blade enters between laminations of the work piece to split the same apart, the two sections of the work piece will be spread away from each other and accordingly will admit the wedge-shaped ridge 73 to enter therebetween. Then, as the work piece is driven further downward by drums 49, 52, the spreading continues to the top of the work piece so that the so-called good piece or section deflects at the front side of the carriage and the so-called bad-piece deflects to the rear. The deflection is augmented by downwardly outwardly flaring sides of the carriage, as at 74 and by deflectors 75 at the bottom of the carriage having wider span than the body of the carriage and carrying the sections of the work piece further outwardly clear of the track 24 and into respective chutes 76, and 77 at the front side and rear side of the track respectively, thereby sorting or segregating the good pieces from the bad pieces.

It will be observed from the showing in Fig. 7, that spreading of the sections of the work piece apart splits the work piece well above the ridge 73 substantially as far as the level of the horizontal diameters of the drums. Therefore, when the top edge of the work piece moves down to a position where no longer engaged and driven by the drums, it will be fully split and the two sections will continue by gravity to their respective chutes 76, 77. Likewise, as the work piece passes free from the drums, the gauging drum moves inwardly toward the other or power-driven roller 49 the effect of which is to permit the bell-crank arms 67 and 70 to swing and release depressive force on the micro-switch button 66 and thereby break the circuit to solenoid 64. The solenoid core is then slid to the other end of its stroke by air pressure and operates the four-way valve 63 to exhaust air from the rear end of the cylinder 60 and admit air at the forward end to retract the carriage ready to repeat the cycle. Preferably the exhaust air just mentioned is conducted by a pipe 78 to the front end of the machine with the terminal 79 of said pipe closely in front of the most forward position of the blade, the air serving to clean away particles and dust from the blade and carriage.

Since the carriage moves forward with great rapidity, I find it advisable to provide a buffer or shock-absorber at its most forward stroke position. One simple form of buffer may comprise a fixed cylinder 80 in advance of the path of the carriage, with a piston rod 81 projecting therefrom to be engaged by the carriage. Air pressure is constantly supplied by pipe 82 at the end of said cylinder toward the front end of the machine which functions to force a piston (not shown) rearwardly, said piston rod 81 being integrated with the piston in said cylinder 80.

Figure 3:
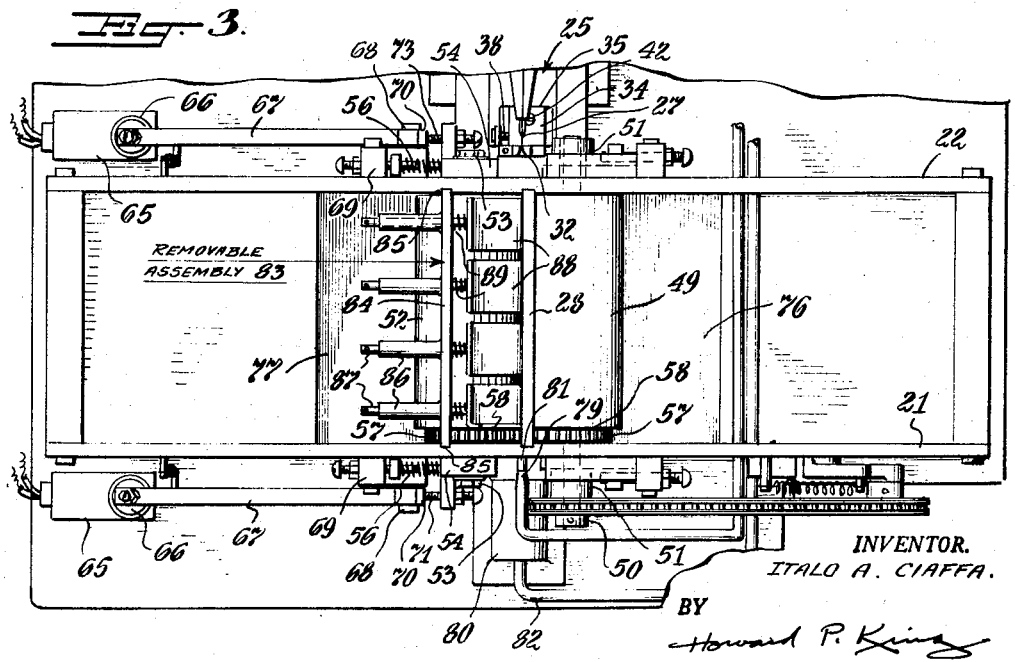
Figure 3 is a plan of the end portion of the machine where the splitting is effected.

For automatic feeding of the work pieces in vertical condition and in plane 30, or if desired for assistance to an operator using the machine, I may provide a feeding assembly 83 in association with guide plate 28. As shown in Figs. 2 and 3, the assembly includes a support shown as a plate 84 held vertically parallel to guide plate 28 and slidable vertically upwardly out of the grooves 85 for removal purposes. At the rear side of the support plate 84 are a plurality of sleeves 86 projecting perpendicularly therefrom and welded or otherwise made fast therewith, said sleeves being shown in upper and lower series with the sleeves of each series spaced evenly apart and with their spacing in both series being alike. A slide pin 87 is in each of said sleeves, projecting to the rear of the sleeve and prevented by a cotter-pin or the like thereat from sliding forwardly out of the sleeve when the assembly is removed from the machine. The forward ends of the slide pins project through support plate 84 and each group of two pins, of which one pin is in the lower series and the other of the group is directly above the lower one, have a shoe 88 attached thereto. There are accordingly a plurality of shoes all of which face the guide plate 28 and for the major lower portion thereof will normally engage flatwise against said guide plate but will retract therefrom as a work piece passes downward between said shoes and the guide plate. Light springs 89 on the slide pins tend to keep the shoes juxtaposed to said guide plate, but without materially deterring the work piece from sliding down between. The upper ends of said shoes 88 slope upwardly rearward away from the guide plate and afford a hopper-like entry for the work pieces.

Figure 15 illustrates a reversing circuit for the solenoid 64 which has two coils 64a and 64b, the first one of which is energized and actuates the core in one direction when the micro-switches 65 are in up position, and the second one of which is energized and actuates the core in the other direction when the micro-switches are in down position. One coil may operate indirectly on the core by sliding an air valve to admit air to slide the said core in one direction.

Undoubtedly it will be observed from the foregoing description, that the machine splits the work piece in such manner that one slice, always at the front side of the blade, is of desired thickness, whereas the other slice at the back side of the blade will be of indiscriminate thickness depending upon the original thickness of the particular work piece that is split. Thus the ones of indiscriminate thickness that I have called for brevity the "bad" section, may actually happen to be of precisely the desired thickness, or may be either too thick or too thin to be in the category of "good" sections. I therefore provide a sorting apparatus, one form of which is shown in Figs. 16 and 17, to discharge as waste those sections from the splitting machine that are too thin for use, and to feed all others to a second splitting machine in duplicate of the first splitting machine as above related.

The heretofore described first splitting machine is indicated in Figure 16 only in general outline sufficient to show the presence thereof and the discharge path therefrom of the so-called "bad" sections or slices of indiscriminate thickness to the previously mentioned rear chute 77. Said chute 77 feeds the pieces successively between the converging portions of two parallel rollers or drums 149 and 152 of which the first mentioned is power driven and the second mentioned is a gauging roller. The construction, mounting and driving of these drums or rollers may be exactly as with rollers 49 and 52 of the splitting machine, and for clarity much of the detail previously shown has been omitted in this view. Swinging movement of the gauging roller 152, as with previously described roller 52 swings the short vertical arm 170 of a bell-crank lever a long arm 167 of which multiplies the movement and operates a micro-switch 165 in similar manner to previously described micro-switch 65, but with this difference, namely, that the long arm is not operative to depress the button of the switch up to movement of the gauging roll to the extent of passage of work pieces having thickness less than thickness of "good" pieces. This initial lost motion in operation may be obtained by adjustment of a screw 171, similar to adjusting screw 71 previously described and shown carried in hanger 154 and engageable with short arm 170 of the bell-crank lever, or by a screw 171a overlying the solenoid button. By virtue of this initial lost motion permitted for the gauging roller, thin work pieces of less thickness than desired will pass downwardly between the rollers without disturbing or operating the micro-switch, and slide down a deflector 175a of steep pitch and off of the bottom edge thereof into a chute 176 and discharged therefrom as waste.

A track 124 like the track 24 previously described extends parallel to and beneath the rollers 149 and 152 and slidably mounted thereon is a carriage 125 in part resembling previously described carriage 25 but having no ridge, the aforementioned deflector 175a extending diagonally upward past where the ridge would be, so as to receive all work pieces from the rollers and deflect them all toward the rear side of the machine. Furthermore, said deflector 175a is longer than the carriage and projects forwardly therefrom a distance such that the front extension is situated under the full lengths of the roller when the carriage is in its retracted position. When the carriage is in its forward position, the rear end portion of said deflector 175a will have been brought forward and will be under the rollers in position to receive work pieces coming to it from between the rollers. At this rear end portion of said deflector 175a the bottom edge thereof is integral with a further deflector 175b which extends further toward the rear side of the machine so as to carry work pieces sliding down the joint slopes of the two deflectors over the top of chute 176 into a more rearward chute 177. The front end edge of this more rearward deflector has an upturned flange 175c thereat to be assured that none of the work pieces inadvertently slide off into the front chute 176. The work pieces passing to the rearward chute 177 are of indiscriminate thickness at least as thick as desired thicknesses of slices. These work pieces can be returned to the first slicing machine or to a second slicing machine just like the first and fed directly from the rearward chute 177 of the sorting apparatus.

The carriage of the sorting machine is driven exactly the same as the carriage of the splitting machine, with another air motor 159 in duplicate of air motor 59 with four way controlling valve and solenoid electrically activated from the pair of micro switches 165 as described above. Normally the air-motor piston is retracted and the single deflector underlies the rollers so that the thin pieces, which do not cause the micro-switches to close, will merely slide into the front chute, whereas thicker pieces will close the micro-switches with the result of the carriage moving forward quickly and thus placing the rear portion of the deflector in position to receive the discharged work piece from the rollers and carry that piece, due to presence of the rearward deflector, to the rearward chute for again being sliced.

Figure 18:
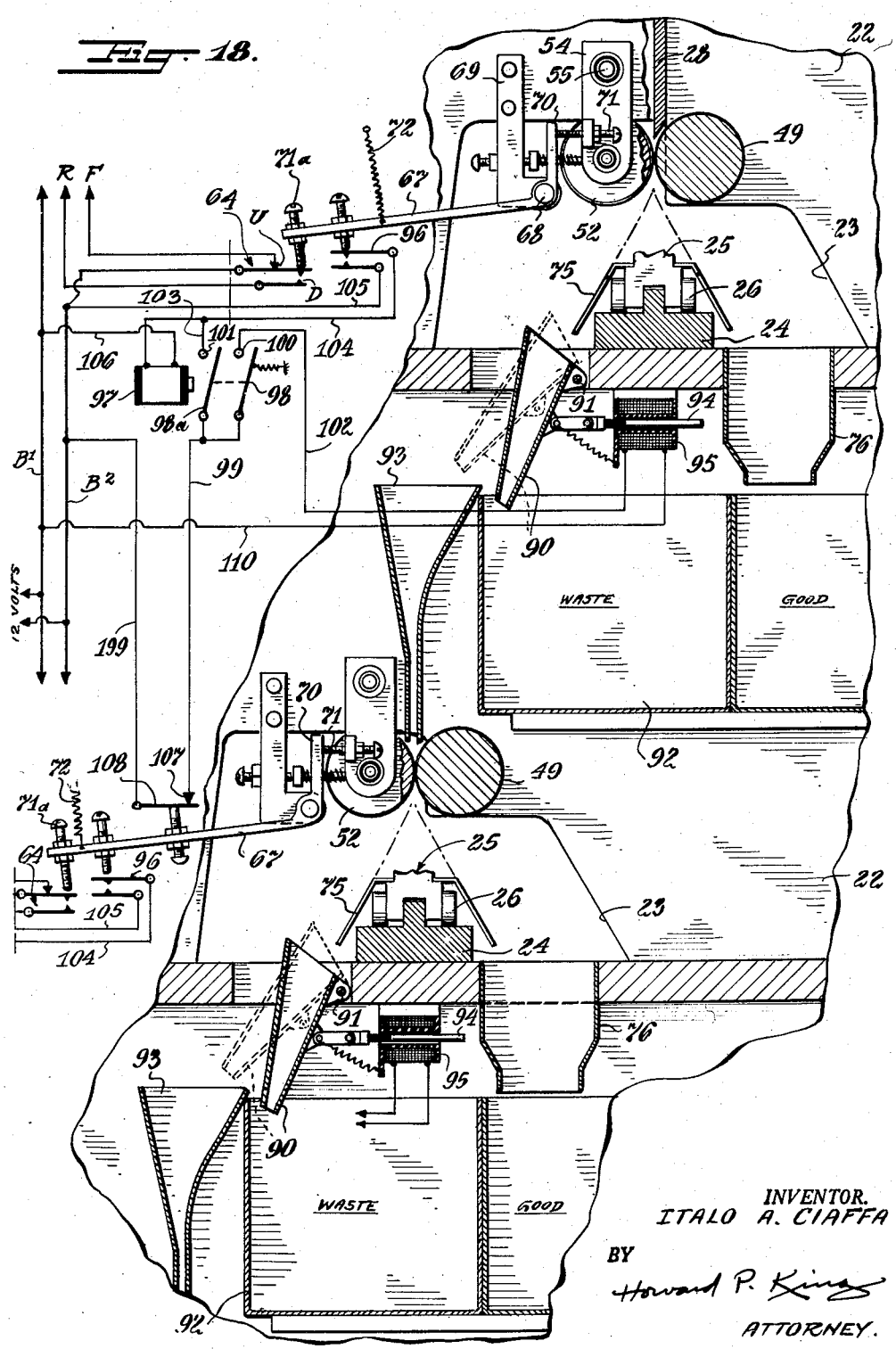
Figure 18 is a view similar to Fig. 16 and showing another embodiment of sorting mechanism from a first to a second splitting machine.

A modification of sorting apparatus is shown in Fig. 18, wherein is shown an upper and a lower splitting machine representative of any number desired in a sequential series whereby the discard from an upper machine is fed to a splitting machine therebelow. The same description and reference numerals apply to each of these splitting machines as for the heretofore described splitting machine, for the most part. The essential difference is the provision of a movable chute 90 for receiving the pieces of indiscriminate thickness from the rear deflector 75 of the carriage, in conjunction with which the gauging roller 52 controls a modified electrical circuit that will discriminate between work pieces of thickness insufficient to make more than one slice of desired thickness and those which will make more than one slice of desired thickness.

The movable chute 90 is shown pivotally mounted at 91 next to its upper end and throughout the permitted amplitude of swing of said chute its upper open end is always in position to receive the indiscriminate work pieces from the rear deflector 75. Swing of said movable chute, however, places its lower or discharge end selectively over a waste bin 92 or over a hopper entry 93 for the work pieces to a next subsequent splitting machine. According to the present showing, the core 94 of a horizontally disposed solenoid 95 will push the movable chute to its position over the hopper entry 93 and a spring and/or gravity will return the chute to its other position feeding into the waste bin.

As with the micro-switch and solenoid electrical control for the air-motor four-way valve with which a 12 volt A.-C. supply is provided, as shown in Fig. 15, a similar supply and micro-switch control is also contemplated for the showing of Fig. 18 wherein the voltage is applied to what may be here called main bus lines B¹ and B². In both views, bus line B¹ is the one that connects with the center tap of solenoid 64 and bus line B² connects with the center tap of the micro-switch 65. Line R from the other end of the retracting coil 64a connects with the up contact U of the air valve controlling solenoid 64, and line F from the other end of the forwardly advancing coil for the solenoid core connects with the downwardly engaged contact D of said micro-switch.

Specific to the showing in Fig. 18, long lever arm 67 of the bell crank lever also functions to close and open a switch 96 for the circuit to the chute operating solenoid 95. This switch 96, however, is arranged to be closed only when the thickness of the work piece passing between rollers 49 and 52 is at least as great as the desired thickness of a usable slice, and it then closes a circuit through a magnet 97 from bus line B¹ to bus line B² whereby the magnet is energized. Said magnet is adapted to close tandem switches 98 and 98a both blades of which are electrically joined and have a common output wire 99 connected therewith. Contact point 100 for one blade 98 has a connecting wire 102 to the chute-operating solenoid 95, and the other contact point 101 has a branch connection 103 to a wire 104 leading from the open side of switch 96 to the magnet. The other contact of switch 96 has a connecting wire 105 to bus B² while the other end of the magnet has wire connection 106 to bus B¹. Aforementioned common output wire 99 leads to the next subsequent splitting machine to the contact point 107 for a switch 108 that is held normally closed by the uplifted long arm 67 of the bell-crank lever of that machine, but which will open when that arm moves downward under influence of a work piece passing between the rollers 49 and 52 of that machine. The other terminal of that switch 108 has a wire connection 109 to bus line B².

Now it will be observed that there is a connection 110 from busline B¹ to the chute-operating solenoid, thence back by wire 102 to switch point 100 of switch 98, and if that switch is closed connection continues by wire 99 to switch point 107 and switch 108 on the next machine and thence by way of a connection 109 to the other bus line B². But it also should be noted that when switch 98 is closed, its companion switch 98a is also closed, and that switch closes a shunt circuit through the magnet to energize the magnet and is only made effective after the magnet has been initially energized by lost-motion switch 96 being first closed, and thus even though lost motion switch 96 opens after the work piece has passed the rollers, the shunt circuit continues to energize the magnet and holds switches 98 and 98a closed. Then when the work pieces passes through the chute deflected as shown in dotted lines in Fig. 18, and enters between the rollers of the next splitting machine, switch 108 is opened, thereby breaking the magnet circuit so that switches 98 and 98a open under influence of spring loading, switch 98 breaking the circuit to the chute-operating solenoid 95 whereupon the chute returns to its normal position shown in full lines in the drawing. Since the magnet 97, associated switches 98 and 98a and the switch 108 on the next machine cooperate to delay opening of the circuit activating the chute-operating solenoid, they may be grouped within the general designation of delay-action means, and I wish it to be understood that other delay-action means found suitable for the purpose may be substituted.

I claim:

1. A machine of the character described, comprising a pair of rollers for receiving and passing work pieces therebetween, one of said rollers being laterally movable from the other under influence of the thickness of the work piece passing between said rollers, a movable carriage adapted to advance to a position beneath the line of contact of said rollers and retractable from therebeneath, a pointed blade on said carriage positioned to pierce an edge of the work piece fed between said rollers, driving means for said carriage to and from said position, and a control for said driving means, said control being activated by the lateral movement of said one roller.

2. A machine of the character described, comprising means for feeding and guiding a laminated work piece in one direction in parallelism to a given plane, a pointed transitional blade for entering between laminations of said work piece at an edge of the same, the point of said blade being movable to the opposite edge of said work piece, and means for actuating said blade transverse to said one direction in a cycle of operation of said point from the entry edge to the opposite edge of the work piece and back again in parallelism to said plane, for splitting the work piece between laminations and for returning the blade point to initial position for repetitious operation.

3. A machine in accordance with claim 2 wherein throat guides are provided in advance of and in close proximity to said blade and adapted to engage and travel along opposite faces of said work piece as the blade travels between laminations thereof.

4. A machine in accordance with claim 2, wherein a wedge-shaped member is located behind the knife and follows said knife between laminations, the splitting of the work piece being continued by the said feeding means advancing the work piece further onto said wedge-shaped member.

5. A machine in accordance with claim 2, wherein said blade is actuated at greater speed than the transition of said work piece by said feeding means.

6. A machine of the character described, comprising a pair of rollers for receiving and passing work pieces therebetween, one of said rollers being laterally movable from the other under influence of the thickness of the work piece passing between said rollers, a lever in connection with said movable roller, said lever having an arm having a portion thereof remote from the lever fulcrum that is swung a multiple of the movement of said roller, an electric switch operated by said remote portion of the lever, a pointed transitional blade movable parallel to said rollers and the point whereof is engageable with an edge of the work piece passing out from between said rollers and movable to the opposite edge of the work piece, a reciprocating motor connected with and for reciprocating said blade crosswise of the work piece from said edge thereof to said opposite edge, and means for effecting instigation of reciprocation of said motor by the closing of said electric switch.

7. In combination with a reciprocating piston air motor having a piston rod and having a control valve and a solenoid for operating said control valve, a carriage connected to and driven by said piston rod, a pair of rollers over the path of movement of said carriage, said rollers adapted to receive a work piece therebetween and said carriage having a forward reciprocating stroke as great as the length of said rollers and from a position of entry of said carriage adjacent to one end of said rollers to pass proximate to said rollers to the opposite end thereof and back again to the entry position, and said carriage having means for engagement with the work piece when the carriage is reciprocated into proximity to said rollers, and means for closing an electric circuit to said solenoid by the introduction of a work piece between said rollers.

8. A combination in accordance with claim 7, wherein sorting means are provided in conjunction with directional discharge of work pieces passing said carriage.

9. An assembly for obtaining slices of ultimate predetermined thickness from laminated work pieces of at least said ultimate thickness by splitting the same, comprising a first and a second machine each having a knife for entry between laminations a predetermined thickness distance from an outside face of the work piece presented thereto and thereby produce an ultimately desired thickness of work piece next to said face and split an adjoining remainder work piece therefrom of indiscriminate thickness, means interposed between said first and second machines for receiving said remainder work piece of indiscriminate thickness from the first said machine, said means having movable chutes directed to discharge to different places, and a movable carriage carrying said chutes, said carriage having an automatic control governed by the thickness of said remainder work piece of indiscriminate thickness fed from said first machine to said interposed means selectively positioning said chutes, and one of said chutes thereby being positioned to receive only a remainder work piece of at least the desired ultimate thickness and said one chute simultaneously being positioned to feed the work piece received thereby to said second machine.

10. A machine of the character described, comprising a pair of rollers having a bite for receiving and passing a work piece therebetween, a movable carriage adapted to advance longitudinally of and to a position proximate to said bite and retractable from said position, said carriage moving in a direction transverse to movement of said work piece, a block on said carriage at the part thereof toward said bite, means for adjusting said block in a direction lateral to said bite and work piece passing through said bite, a pointed blade secured to said block for piercing an edge of a work piece fed between said rollers, the thickness of the ultimately desired sliced work piece being governed by lateral adjustment of said block and blade fixing the distance of offset of the point of said blade in piercing between laminations from a selected face of said work piece as said carriage is advanced.

11. A machine of the character described, comprising a pair of rollers having a bite for receiving and passing a work piece therebetween, a movable carriage adapted to advance longitudinally of and to a position proximate to said bite, a throat guide at the advancing end of said carriage, said throat guide being adapted to receive and pass the work piece therethrough as the carriage advances and retain said work piece from lateral deflection in vicinity of said throat guide in a prescribed plane, a block on said carriage near said throat guide, means for adjusting said block in a direction toward and from said plane, a pointed blade the point whereof is toward and proximate to said throat guide and said blade being secured to said block and located in parallelism to said plane, the thickness of the ultimately desired sliced work piece being governed by lateral adjustment of said block and blade fixing the distance of offset of the point of the blade from said plane.

References Cited in the file of this patent

UNITED STATES PATENTS

| | | |
|---|---|---|
| 1,834,762 | Bjorklund | Dec. 1, 1931 |
| 1,945,883 | Connelly | Feb. 6, 1934 |
| 2,471,738 | Goodman | May 31, 1949 |
| 2,551,655 | Bennett | May 8, 1951 |
| 2,713,860 | Lake | July 26, 1955 |